(12) United States Patent
Basset et al.

(10) Patent No.: US 7,195,028 B2
(45) Date of Patent: Mar. 27, 2007

(54) SELF-CONTAINED OXYGEN GENERATOR

(75) Inventors: Chrystelle Basset, Grenoble (FR); Philippe Jean, Grenoble (FR); Nicolas Schmutz, Grenoble (FR)

(73) Assignee: L'Air Liquide, Société Anonyme Á Directoire et Conseil de Surveillance pour l'Étude Et l'Exploitation des Procedes Georges Claude, Paris (FR)

( * ) Notice: Subject to any disclaimer, the term of this patent is extended or adjusted under 35 U.S.C. 154(b) by 15 days.

(21) Appl. No.: 10/909,625

(22) Filed: Aug. 2, 2004

(65) Prior Publication Data

US 2005/0028868 A1    Feb. 10, 2005

(30) Foreign Application Priority Data

Aug. 4, 2003   (FR) ................... 03 50395

(51) Int. Cl.
*G05D 7/06*      (2006.01)
*B01D 53/047*    (2006.01)

(52) U.S. Cl. ............... 137/115.03; 137/114; 137/487.5; 128/204.21

(58) Field of Classification Search .......... 137/115.03, 137/114, 486, 487.5; 128/204.21, 204.22
See application file for complete search history.

(56) References Cited

U.S. PATENT DOCUMENTS

| | | | |
|---|---|---|---|
| 5,199,423 A * | 4/1993 | Harral et al. .......... | 128/202.26 |
| 6,261,344 B1 | 7/2001 | Labasque et al. | |
| 6,269,811 B1 * | 8/2001 | Duff et al. .............. | 128/204.21 |
| 6,270,556 B1 | 8/2001 | Rouge et al. | |
| 6,406,520 B1 | 6/2002 | Lledos | |
| 6,446,630 B1 * | 9/2002 | Todd, Jr. ................ | 128/204.18 |
| 6,475,265 B1 | 11/2002 | Baksh et al. | |
| 6,520,176 B1 | 2/2003 | Dubois et al. | |
| 6,712,877 B2 * | 3/2004 | Cao et al. ....................... | 95/10 |
| 6,948,498 B2 * | 9/2005 | Cazenave et al. ....... | 128/204.22 |
| 2003/0192431 A1 * | 10/2003 | Lee et al. ...................... | 95/96 |
| 2004/0250681 A1 | 12/2004 | Balland et al. | |

FOREIGN PATENT DOCUMENTS

| FR | 03 06608 | | 12/2004 |
|---|---|---|---|
| JP | 2000-210525 A | * | 2/2000 |
| JP | 2002-121010 A | * | 4/2002 |

OTHER PUBLICATIONS

International Search Report for FR 03 50395.
Database WPI Section Ch, Week 200316; Derwent Publications Ltd., London, GB; AN 2002-640997; & KR 351 621, Sep. 5, 2002.
Database WPI Section Ch, Week 200410; Derwent Publications Ltd., London, GB; AN 2003-007220; & JP 2002 306918, Oct. 22, 2002.

* cited by examiner

*Primary Examiner*—Ramesh Krishnamurthy
(74) *Attorney, Agent, or Firm*—Christopher J. Cronin

(57) ABSTRACT

A self-contained oxygen generator containing a PSA unit and a flowmeter in the outlet line. The flowmeter provides a signal which represents the flow rate of the oxygen in the outlet line. A leakage circuit with a calibrated orifice and a solenoid valve are also located on the outlet line. In response to a signal from the flowmeter, the solenoid can be actuated so as to provide a calibrated leakage at the outlet of the PSA. This calibrated leakage is useful when overall oxygen usage is too low.

10 Claims, 1 Drawing Sheet

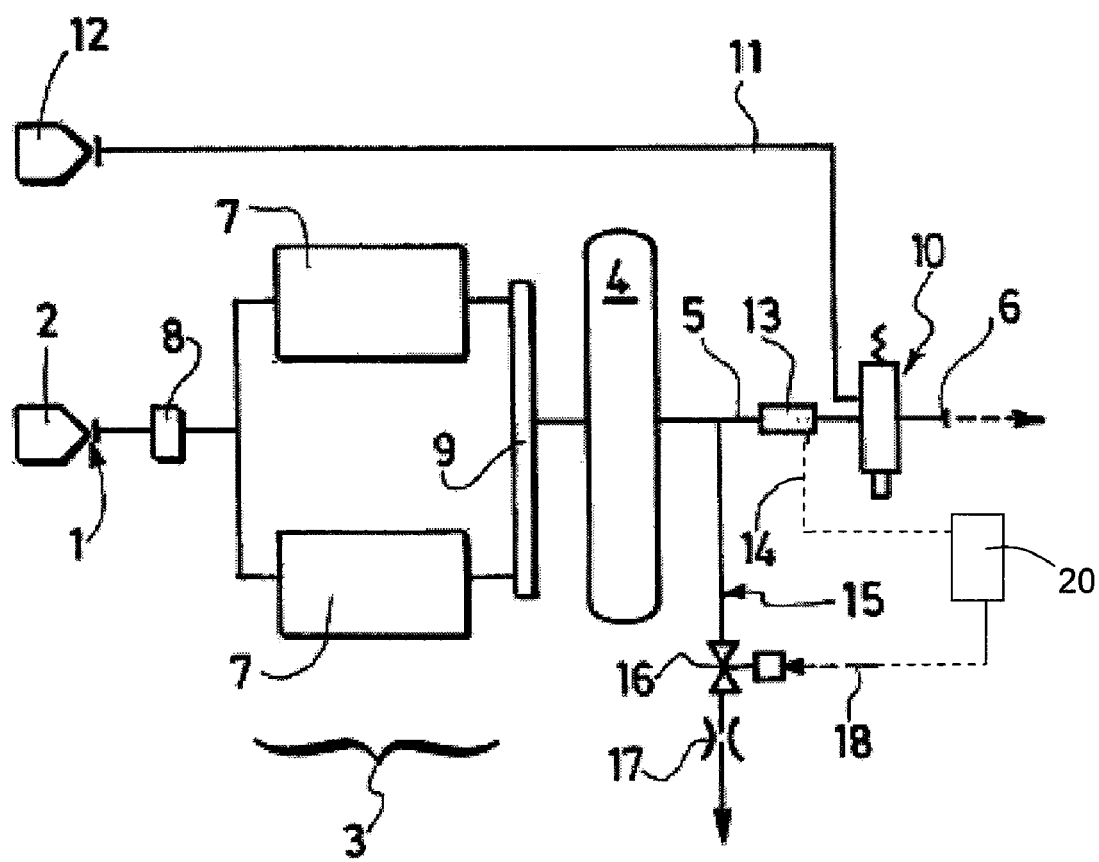

SELF-CONTAINED OXYGEN GENERATOR

This application claims the benefit of priority under 35 U.S.C. § 119 (a) and (b) 1 to French Application No. 03 50395, filed Aug. 4, 2003, the entire contents of which are incorporated herein by reference.

BACKGROUND

The present invention concerns self-contained portable oxygen generators, also called concentrators, capable of providing oxygen with a purity of between 90 and 95%, by pressure adsorption in a PSA unit comprising at least one adsorber.

PSA units provide oxygen of which the purity depends on the consumption rate. Even with efficient adsorbents, a rapid fall in performance is found at high rates and a progressive but marked fall in performance at low rates.

In known self-contained oxygen generators, it has been proposed to adapt the production process to the oxygen consumption, in particular by temporarily stopping the PSA unit or by adapting the cycle time according to the rate at which the flow is consumed. Such systems necessitate the intervention of an operator and stabilization times are incompatible with the reactivity required by user patients.

The object of the present invention is to provide a self-contained oxygen generator avoiding the abovementioned disadvantages, in particular by not requiring modifications to the cycle time nor human interventions, with maintenance of a virtual steady state.

SUMMARY

To this end, according to the invention, the self-contained oxygen generator, of the type comprising an inlet that can be connected to a source of pressurized air, a PSA unit with at least one adsorber, an oxygen outlet line that can be connected to at least one upper airways line supply circuit of at least one user, additionally includes, in the outlet line, a flowmeter providing an electrical signal representative of the flow rate of oxygen passing through the outlet line, and a leakage circuit connected to the outlet line and comprising, in series, a solenoid valve that can be actuated in response to a signal derived from the electrical signal provided by the flowmeter, and a calibrated restriction.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

The single FIGURE illustrates one embodiment of a self-contained oxygen generator according to the invention.

DESCRIPTION OF PREFERRED EMBODIMENTS

To this end, according to the invention, the self-contained oxygen generator, of the type comprising an inlet that can be connected to a source of pressurized air, a PSA unit with at least one adsorber, an oxygen outlet line that can be connected to at least one upper airways line supply circuit of at least one user, additionally includes, in the outlet line, a flowmeter providing an electrical signal representative of the flow rate of oxygen passing through the outlet line, and a leakage circuit connected to the outlet line and comprising, in series, a solenoid valve that can be actuated in response to a signal derived from the electrical signal provided by the flowmeter, and a calibrated restriction.

According to other particular features of the invention:
the flowmeter is a hot-wire mass flowmeter,
the generator includes, in the outlet line, a switching valve connected to an auxiliary source of pressurized oxygen,
the outlet line is connected upstream to a buffer tank advantageously forming a structural component of the architecture of the generator.

In the embodiment shown in the single FIGURE, the self-contained oxygen generator substantially comprises an air inlet 1 that can be connected to a source of air pressure 2 available on site, a PSA unit 3, an oxygen buffer tank 4 and an outlet line 5 toward an outlet 6 that can be connected to at least one patient circuit for supplying an oxygen-rich breathing mixture to the respiratory airways of the patient.

Typically, the PSA unit 3 has two adsorbers 7, each containing a particulate material capable of separating oxygen from the air, typically a zeolite, advantageously a lithium zeolite of the LiX type, preferably an LiLSX zeolite.

A pressure-reducing device 8 is provided upstream of the PSA unit 3 for adjusting the pressure of air coming from the source 2, generally at around 7–9 bar, and a manifold with valves 9, permitting circuit reversals and adsorber-to-adsorber changes, is provided between the PSA unit 7 and the buffer tank (4).

The outlet line 5 is preferably fitted with a distribution valve 10 connected to a line 11 that can be connected to an independent pure oxygen source 12 in order to make up for possible deficiencies or periods of unavailability of the PSA unit 3.

According to one aspect of the invention, the outlet line 5 includes a tapping for a mass flowmeter 13, advantageously of the hot-wire type, offering very low inertia, providing an electrical signal 14 representative of the mass flow rate of oxygen circulating in the outlet line 5.

The latter is additionally connected, between the tank 4 and the distribution valve 10, to a branch line 15 emerging in the outside air and comprising, in series, a solenoid valve 16 and a calibrated orifice or a restriction 17.

According to the invention, the solenoid valve 16 is controlled by an electrical signal 18 derived, via electronics 20, from the flow rate signal 14 provided by the flowmeter 13.

Accordingly, in the case of too low an oxygen consumption, the flow rate measured by the flowmeter 13, falling below a given threshold, causes the solenoid valve 16 to open and a calibrated leakage to be established via the restriction 17 so as to simulate a consumption minimum and to continue to make the PSA unit 3 work within the range of flow rates corresponding to the maximum oxygen purity plateau.

The invention therefore provides an automated purge not requiring modifications to the cycle time and making it possible immediately to obtain a steady state without the necessity of stabilization with transients.

Although the invention has been described in relation to particular embodiments, it is not limited to these but is capable of modifications and variants that will be apparent to a person skilled in the art within the framework of the following claims.

In particular, in order to obtain advanced architectural integration of the generator, the buffer tank 4 is advantageously formed so as to constitute a structural component of the architecture of the generator, as described in French patent application FR 03/06608.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus which may be used as a self-contained oxygen generator comprising:
    a) a generator inlet;
    b) a PSA unit, wherein said unit comprises at least one adsorber;
    c) an oxygen outlet line;
    d) a flowmeter, wherein said flowmeter;
        1) is located in said outlet line; and
        2) provides an electrical flow rate signal representative of the flow rate of oxygen passing through said outlet line;
    e) an outlet line leakage circuit comprising;
        1) a solenoid valve that can be actuated in response to said signal; and
        2) a calibrated restriction; and
    f) an electronics element electrically connected to said flowmeter and said solenoid valve, wherein said electronics element, said flowmeter and said solenoid valve are configured such that:
        1) said electronics element receives said electrical flow rate signal from said flowmeter
        2) said solenoid valve receives a control signal from said electronics element;
        3) said control signal is derived from said electrical flow rate signal; and
        4) upon receipt of said electrical flow rate signal from said flowmeter indicating an oxygen flow rate below a predetermined threshold, said solenoid valve is caused to open by said control signal from said electronics element.

2. The apparatus of claim 1, wherein;
    a) said inlet is connected to a source of pressurized air; and
    b) said outlet line is connected to an airways line supply circuit of a user.

3. The apparatus of claim 1, wherein said solenoid valve and said calibrated restriction are located, with respect to each other, in series.

4. The apparatus of claim 1, wherein said flowmeter comprises a hot-wire mass flowmeter.

5. The apparatus of claim 1, further comprising a switching valve, wherein said switching valve is connected to an auxiliary source of pressurized oxygen and to said outlet line.

6. The apparatus of claim 1, wherein said adsorber comprises a lithium zeolite.

7. The apparatus of claim 6, wherein said lithium zeolite comprises an LiLSX.

8. The apparatus of claim 1, further comprising a pressure-reducing device between said inlet and said PSA unit.

9. The apparatus of claim 1, further comprising a buffer tank connected to said outlet line.

10. The apparatus of claim 9, wherein said buffer tank forms a structural component of said generator.

* * * * *